United States Patent [19]

Yaeger

[11] Patent Number: 5,023,737
[45] Date of Patent: Jun. 11, 1991

[54] DISC DRIVE SLIDER LIFTER USING SHAPE MEMORY MATERIALS

[75] Inventor: John R. Yaeger, Sunnyvale, Calif.
[73] Assignee: Seagate Technology, Inc., Scotts Valley, Calif.
[21] Appl. No.: 505,011
[22] Filed: Apr. 5, 1990
[51] Int. Cl.⁵ .......................... G11B 5/54; G11B 21/22
[52] U.S. Cl. .................................................. 360/105
[58] Field of Search ........................................ 360/105

[56] References Cited

U.S. PATENT DOCUMENTS

| | | | |
|---|---|---|---|
| 4,605,979 | 8/1986 | Inoue et al. | 360/105 |
| 4,684,913 | 8/1987 | Yaeger | 337/140 |
| 4,725,908 | 2/1988 | Sakaki | 360/105 |

Primary Examiner—Robert S. Tupper
Attorney, Agent, or Firm—Flehr, Hohbach, Test, Albritton & Herbert

[57] ABSTRACT

A slider lifter for a disc drive is disclosed which utilizes an element of a shape memory alloy to lift multiple transducer heads away from the surfaces of a plurality of stacked discs. The slider lifter includes a support post and a pair of opposing combs carried by the post. The combs are adapted to move in opposite directions between first and second relative positions. In one of the relative positions, the combs engage the flexures to physically lift the transducers carried by the flexures from the surfaces of their associated discs. A biasing mechanism cooperates with shape memory alloy having martensitic and austenitic phase conditions to move the combs back and forth between the first and second positions. When the shape memory element is in a first phase condition, the biasing means forces the combs to their first relative position and when the shape memory alloy element is in the second phase condition, the combs are held in their second relative position. The shape memory alloy element is selectively heated to control its phase condition.

15 Claims, 3 Drawing Sheets

DISC DRIVE SLIDER LIFTER USING SHAPE MEMORY MATERIALS

The present invention relates generally to disc drives. More particularly a lifter arrangement is provided for physically lifting the read/write heads off of the drive's information storage discs during startup and shutdown. The lifter arrangement utilizes shape memory materials.

BACKGROUND OF THE INVENTION

Disc drive machines record and reproduce information stored on a recording media. Typical hard disc drives, often referred to as Winchester disc drives include one or more vertically-aligned, rotating information storage discs, each having a pair of associated magnetic read/write heads or sliders that are adapted to transfer information between the disc and an external computer system. One of the sliders communicates the upper surface of the disc, while the other slider communicates with the lower disc surface. The information storage discs are journaled about a spindle motor assembly capable of rotating the discs at high speeds. The sliders are carried by a plurality of vertically-aligned, elongated flexure arms that in turn are carried by a head positioner assembly. The head positioner assembly is adapted to move the sliders back and forth in unison across the face of the vertically-aligned discs. The head positioner assembly is traditionally either rotationally mounted or takes the form of a carriage that is free to move back and forth along a single axis. In either case, the head positioner assembly is adapted to precisely position the heads relative to the magnetic information storage discs.

In the typical operation of such a disc drive, the sliders rest on landing zones on the surface of their associated discs when the power is off. In operation, the drive unit is powered up and the disc pack begins to rotate. Once the disc reaches a certain critical speed, the sliders rise slightly off the landing zone under the lifting influence of an air current which is created by the rotation of the discs. During normal operation, the sliders remain floating above the discs and are said to "fly" over the discs, thereby preventing wear on the disc surfaces and potential destruction of the data. However, until the sliders rise, there is considerable friction associated with the heads dragging over the discs. Such friction causes wear to both the heads and the discs. When the drive unit is powered down, the same friction will occur between the surfaces of the heads and the rotating disc surfaces. In practice, breaking the heads free from the disc surface can require a considerable force to overcome the forces which hold the two smooth surfaces together (called stiction).

In order to reduce this friction and minimize disc damage, the discs are coated with a protective layer and lubricants are applied to the disc surfaces. Additionally, the discs typically require a dedicated landing zone where the sliders can slide to a halt and rest when the drive unit is turned off. No data can be stored in this dedicated landing zone since repetitive starting and stopping of the disc tends to wear the landing zone. Consequently, the amount of data that can be stored on each disc is reduced. Moreover, a relatively large disc drive motor is required to overcome the adverse friction and stiction effects. Further, a motor brake is often also required to stop the rotation of the discs when the motor is turned off to reduce frictional wear during power down operations.

Thus, it should be apparent that it is desirable to raise the sliders during power-up and to keep them up until the disc pack has essentially come to a halt. Such an ability would eliminate the adverse effects of friction.

A wide variety of arrangements have been proposed to raise and lower the sliders at selected times. A few attempts have been made to take advantage of the shape memory metal phenomenon within the lifter mechanism. The phenomenon of shape memory is, of course, well understood. It is based on the thermoelastic martensitic transformation which is briefly explained hereunder. A shape memory alloy, such as Ti-Ni alloy, has a high temperature austenitic phase wherein the crystal structure is body center cubic. When cooled below its transformation temperature, the austenitic structure undergoes a diffusionless shear transformation into a highly twinned martensitic crystal structure. In the martensitic phase, the alloy is easily deformed by the application of a small external force. However, in the austenitic phase, the alloy is very strong and is not easily deformed. When the alloy is heated through its transformation temperature, the martensitic phase is elastically returned to the austenitic phase (referred to as an inverse transformation) according to a given ordered crystal and orientation law. A notable characteristic of the alloy is the extremely large recovery force that is generated when returning to the austenitic phase. Therefore, employing a resilient biasing force capable of deforming the alloy in its martensitic phase permits the alloy to be used as a reversible actuator with temperature cycling. Further, since the recovery force which is generated with the return of the austenitic phase is quite large, it is possible to take advantage of the recovery force to do work.

It is important to the design of slider lifters to provide a device which raises and lowers the sliders without requiring modification of the design of the flexure arms. Avoiding modification of the existing design of the flexure arm is a primary requirement of a successful device for loading and unloading the heads. The lack of commercial success of prior-art designs is due in significant part to this fact. The reason is that in a conventional floating head slider, the head is expected to float in a stable fashion about 0.2 micrometers over the surface of the disc which is rotating at a constant speed. Therefore, the combined flexure arm and slider are very sensitive to their loading and air foil characteristics. A great deal of time and effort has gone into their design. Accordingly, any design that requires modification of the flexure arm is looked upon with great disfavor.

Two prior art patents representative of the use of shape memory alloy technology in lifter arrangement for magnetic disc drive apparatus are U.S. Pat. No. 4,605,979 (to Inoue) and 4,684,913 (to Yaeger). The devices described in both of these patents incorporate shape memory metals in an attempt to provide a more efficient system for loading and unloading a transducer head from a disc surface. However, they both utilize relatively high profile devices which require significant spacing between adjacent discs. In present disc drive technology, such spacing is simply no longer available. To minimize the size of disc drives being manufactured today, discs are frequently spaced as closely as the supporting flexure will allow. Accordingly, it should be apparent that it is important that the lifter design maintains an extremely low profile without requiring modification of the flexures' design.

The devices disclosed in these patent are also adapted to lift only a single slider or two adjacent sliders. Thus, in disc drives having multiple discs, several of the described structures would have to be used in order to properly lift all of the sliders. Such repetitive designs are undesirable since they add complexity and cost the drives assembly and increase the number of parts that can potentially fail.

SUMMARY OF THE INVENTION

Accordingly, it is a primary objective of the present invention to provide a slider lifter for disc drives that is capable of simultaneously lifting multiple sliders from opposite sides of a plurality of discs within disc pack.

Another objective is to provide a lifter design that does not require modification of the flexure design and that is capable of lifting the heads from tightly packed discs.

To achieve the foregoing and other objects and in accordance with the purpose of the present invention, a slider lifter for a disc drive is disclosed which utilizes an element of a shape memory alloy to lift multiple transducer heads away from the surfaces of a plurality of stacked discs. The slider lifter includes a support post and a pair of opposing combs carried by the post. The combs include fingers which are adapted to move in opposite directions between first and second relative positions. In a preferred embodiment, in the first of the relative positions, the comb's fingers engage the flexures to physically lift the transducers carried by the flexures from the surfaces of their associated discs. In the second of the relative positions, the comb's fingers are not lifting the flexures. Alternatively, the first and second positions could be reversed.

A shape memory alloy element having artensitic and austenitic phase conditions is used in combination with a biasing means to move the combs back and forth between the first and second positions. Specifically, when the shape memory element is in a first phase condition, the biasing means forces the combs to their first relative position against the influence of the biasing element; when the shape memory alloy element is in the second phase condition, the combs are held in their second relative position by the biasing element. The shape memory alloy element is selectively heated to control its phase condition.

In a preferred embodiment, the biasing mechanism includes a plurality of leaf springs which couple the combs to the post. The leaf springs include two outer leaf springs and two inner leaf springs, with one inner leaf spring and one outer leaf spring cooperating to couple each comb to the post. The shape memory alloy element is coupled between the outer leaf springs to effectuate movement between respective comb positions.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

DETAILED DESCRIPTION OF THE DRAWINGS

In accordance with the present invention, a slider lifter structure is disclosed which is adapted to lift the read/write transducer heads in conventional disc drives off of the disc surfaces during startup and shutdown operations. A comb structure is provided which is actuatable between lifting and non-lifting positions. The actuating mechanism utilizes a shape memory alloy element in combination with biasing leaf springs to move opposing comb members between their lifting and non-lifting positions.

Figure 1:
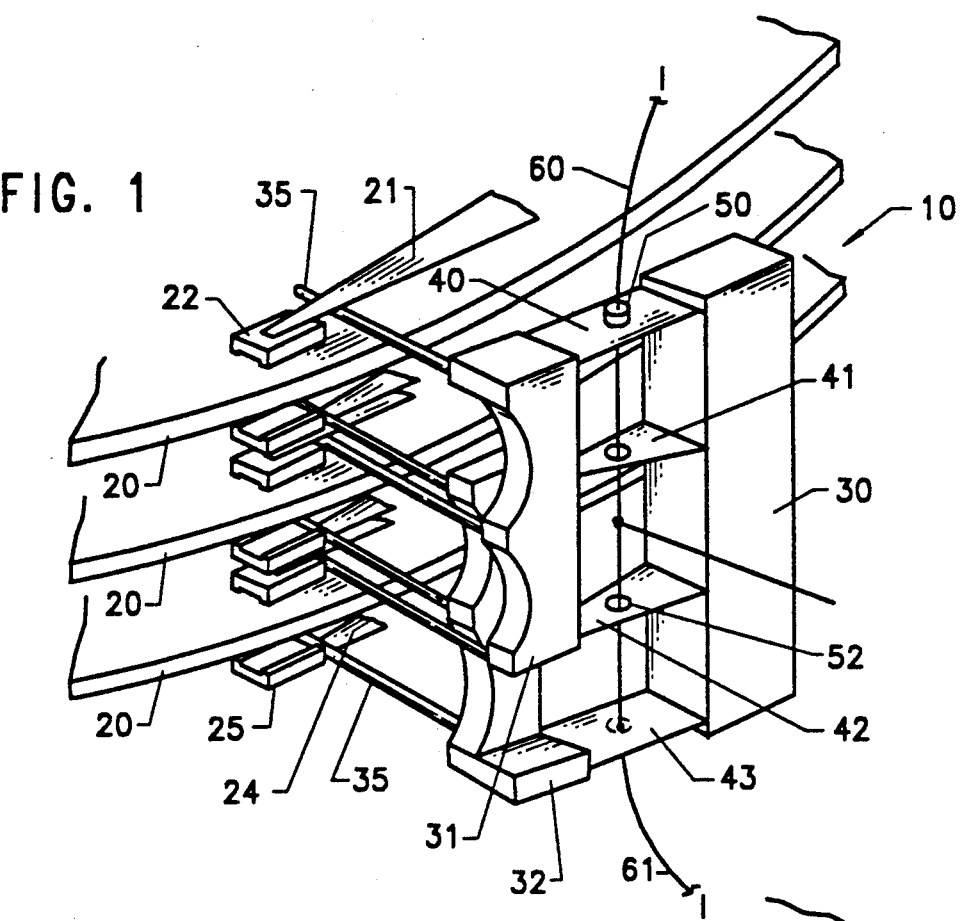
FIG. 1 is diagrammatic perspective view of a slider lifter constructed in accordance with the present invention with its combs in a closed lifting position.
Figure 2:
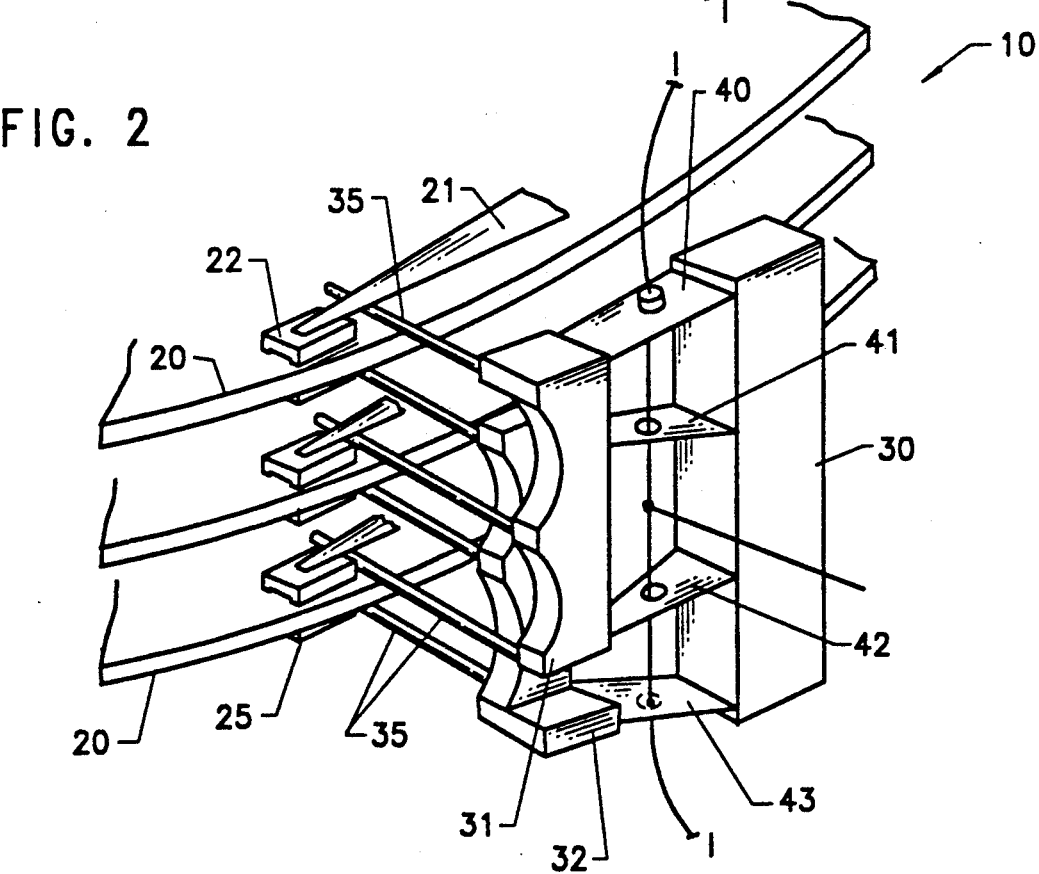
FIG. 2 is a diagrammatic perspective view of the slider lifter shown in FIG. 1 with the combs in an open non-lifting position.

Referring initially to FIGS. 1 and 2, a slider lifter mechanism 10 incorporating the teachings of the present invention is shown in diagrammatic form. A typical Winchester type disc drive includes plurality of information storage discs in the form of magnetic discs 20 that are journaled about a spindle motor assembly within a housing having upper and lower casing members respectively. For clarity, only a portion of the information storage discs 20 are shown. In the embodiment of the disc drive chosen for the purpose of illustration, three spaced apart information storage discs 20 are utilized.

Each information storage disc 20 has a multiplicity of concentric information storage tracks for recording information. A conventional head positioner assembly (not shown) is rotatably mounted between the upper and lower casing in one corner of the housing. The head positioner assembly carries a plurality of flexure arms 21 that each carry a magnetic read/write data head (slider) 22 for reading information from and writing information onto the information storage discs 20. One of the flexures functions as a servo arm flexure 24 which carries a servo head 25 for accurately positioning the magnetic data heads 22 relative to the information storage tracks. A voice coil motor (not shown) is adapted to precisely rotate the head positioner assembly back and forth such that the magnetic and servo heads move across the information storage discs.

The slider lifter mechanism 10 is a comb arrangement including a post 30, a pair of opposing interleaved comb members 31 and 32 each of which has a plurality of stacked fingers 35 extending outward, a plurality of leaf springs 40–43 and a shape memory element 45. The support post 30 is fixably coupled to the drive housing. A series of four leaf springs 40–43 couple the comb members 31 and 32 to the post. The leaf springs include outer leaf springs 42 and 43, as well as inner leaf springs 41 and 40. Each of the comb members is supported by an inner and outer leaf spring pair. Thus, upper comb member 31 is supported by leaf springs 40 and 42, while lower comb member 32 is supported by leaf springs 41 and 43.

Each comb has a plurality of vertically aligned fingers 35 that extend outward either near to or into the spaces within the disc pack. In the embodiment chosen for the purpose of illustration, the disc pack includes three vertically aligned spaced apart information storage discs 20. Each comb has the same number of fingers 35 as there are discs 20. Accordingly, each comb member 31, 32 has three fingers 35 extending therefrom. The fingers 35 are each adapted to extend underneath a particular flexure 21, and even between the flexure and its associated disc surface when the flexure is in its parked, non-operating position. The fingers 35 extending from the upper comb member 31 are adapted to engage the flexures 21 that carry sliders 22 for transducers which read the top surfaces of their associated discs 20, while the fingers 35 extending from the lower comb member 32 are adapted to engage the flexures 21 that carry sliders for transducers which read the bottom surfaces of their associated discs.

Figure 3:
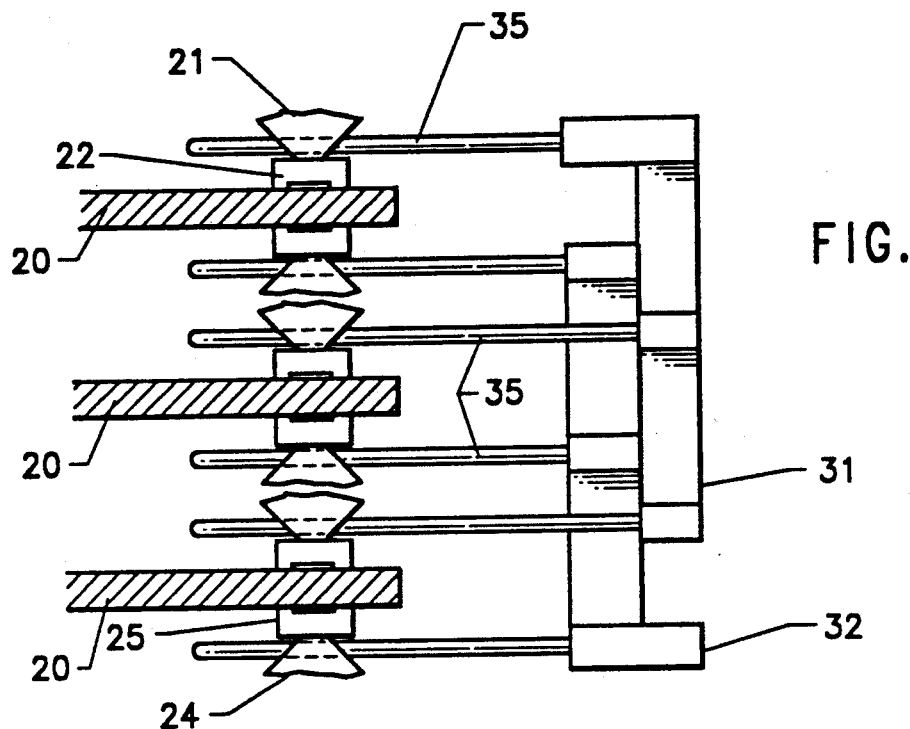
FIG. 3 and FIG. 6A are a schematic side elevational view of the slider lifter shown in FIG. 1 with the combs in the closed lifting position.
Figure 4:
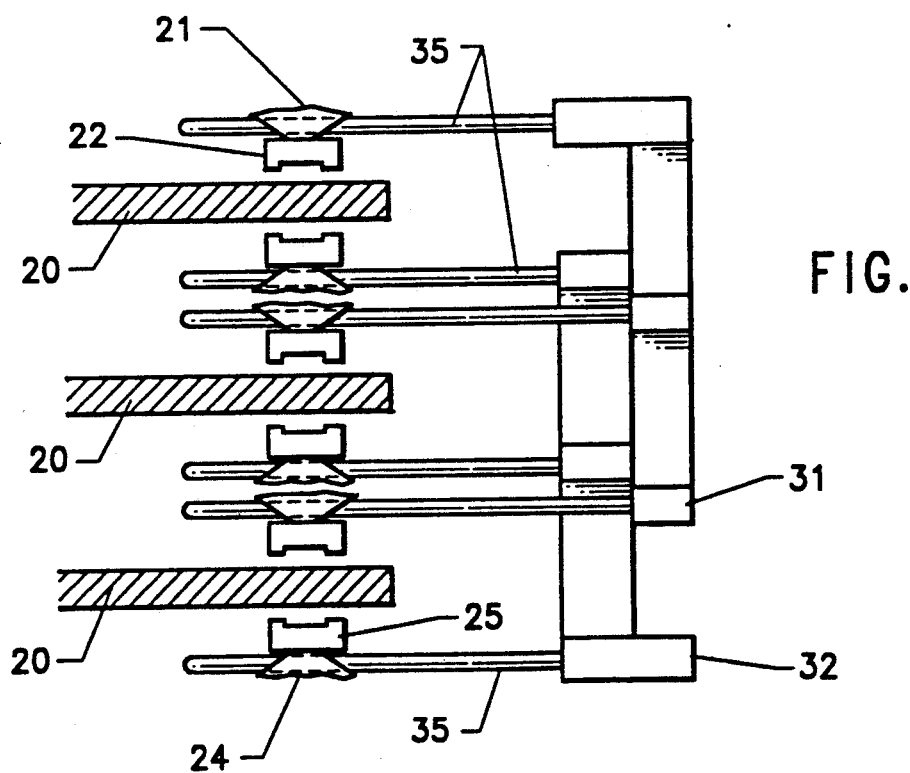
FIG. 4 and FIG. 6B are a schematic side elevational view of the slider lifter shown in FIG. 1 with the combs in the open non-lifting position.

The comb members 31 and 32 are moveable relative to one another between a closed lifting position (as shown in FIGS. 1 and 3) and an open, non-lifting position (as shown in FIGS. 2 and 4). In the closed, lifting position, the fingers engage their associated flexures to "lift" the flexures and their associated sliders away from the surfaces of their associated discs. In the open, non-lifting position, each finger extends harmlessly into the airspace either slightly overlying the edge of the disc or immediately adjacent the disc.

The leaf springs 40-43 and the shape memory element 45 cooperate to selectively move the comb members between their open and closed positions. The shape memory element 45 takes the form of a metallic lift wire extending between the outer leaf springs 40 and 43. The lift wire 45 passes through each of the four leaf springs and its two ends terminate in crimps or stops 50 located just outside the opposing outer leaf springs 40 and 43. Inner leaf springs 41 and 42 are each provided with relatively large apertures 52 (when compared to the diameter of the lift wire 45), through which the lift wire may freely pass. The lift wire passes through smaller apertures in the outer leaf springs as well. However, the apertures in the outer leaf springs are sized such that the stops 50 will not pass therethrough.

The lift wire 45 is fabricated from a shape memory alloy. By way of example a shape memory metal alloy such as Ti-Ni works well. The shape memory alloy has a high temperature austenitic phase having a relatively high strength and a low temperature martensitic phase having a relatively low strength. At ambient temperatures, the shape memory alloy is in its low temperature martensitic phase. When heated, it reverts to its austenitic phase. Since the wire is relatively small diameter, its temperature can be readily raised by passing an electrical current therethrough. The resistance of the small diameter wire is sufficient to accomplish the required heating. By way of example, a Ti-Ni wire having a diameter of 6 mils will heat sufficiently from ambient temperatures to revert to its austenitic phase in approximately 1-2 seconds under the influence of an electrical current of 500 milliamps. When the current is shut off, the wire will transform to its martensitic phase within approximately 5 seconds.

The preferred embodiment is configured so that in the power-off position, the combs are in the lifting position. (See FIG. 6A.) this lifting position, shown also in FIG. 4, is also called the open position. By "open", it is meant that the combs 31, 32 are spread apart to the maximum extent possible. This keeps the heads off the disc when the drive is turned off. At power-up, the disc is run up to speed, the actuator is energized, and the heads lowered as shown in FIG. 3. This is called the closed position of the combs, where the combs are close together. The heads moved to a more inward track and the actuator de-energized per FIG. 6A.

The resilient strength of the leaf springs 40-43 is selected such that when the lift wire is in the austenitic phase, the leaf springs cannot significantly deform the lift wire. However, when the lift wire 45 is in the martensitic phase, the leaf springs readily overcome the lift wire, thereby causing its elongation. In the embodiment described, when the shape memory element is in the martensitic phase, the comb members are held in the open, lifting position with the fingers lifting the sliders away from the surface of the disc. At the same time, the leaf springs 40-43 are arranged to bias the combs to the open, non lifting position shown in FIG. 3. Accordingly, when the lift wire 45 is allowed to cool to its martensitic phase, the sliders 22 must be brought to the edge of the disc to lie over the fingers 35 of the comb are set down on the surface of the information storage discs 20.

With such an arrangement, whenever power is applied to the disc drive, that same power may be used to heat the lift wire 45, changing the lift wire from its martensitic phase to its austenitic phase. With the sliders 22 now on or near the disc 20, they may easily be moved to positions on the disc where data may be written or read. As soon as the heads are moved away, power to the wire 45 wi withdrawn, allowing the combs to move to the open position. When the drive is powered down, the current to the lift wire again is turned on, moving the comb's fingers close to the disc so that the flexures 21 can be moved over the fingers 35. The power is then withdrawn from wire 45, allowing the lift wire 45 to cool down. The cooling of the lift wire induces a phase transformation to the martensitic condition. As the wire cools, the resilient force of the leaf springs 40-43 deforms the lift wire thereby gradually shifting the comb members to their open non-lifting positions. In this manner, the sliders are gradually and slowly moved away from the disc surface of the disc after power has been removed.

In modern disc drives, the information storage discs 20 within a disc pack are typically spaced as close together as the flexure design allows in order to minimize the required disc size. Accordingly it is important that the fingers 35 maintain a low profile. It is also imperative that they never actually contact the disc during operation. To prevent any unintended contact between the information storage discs 20 and the fingers 35, stops may optionally be provided to limit the relative motion of the combs. As indicated above, conventional sliders float about 0.2 micrometers above the surface of the discs which the access. Although the actual floating height will vary somewhat between specific flexure design, it is also important to prevent the fingers from lifting the sliders too far above the disc surface. Accordingly, the stops may be arranged to limit the movement of the combs in both directions.

It is generally desirable to maintain the comb members in the closed position during operation in case of an inadvertent loss of power. This is achieved with the approach described above, without any application of power to the combs except at the beginning and end of a cycle.

Figures 6A, 6B:
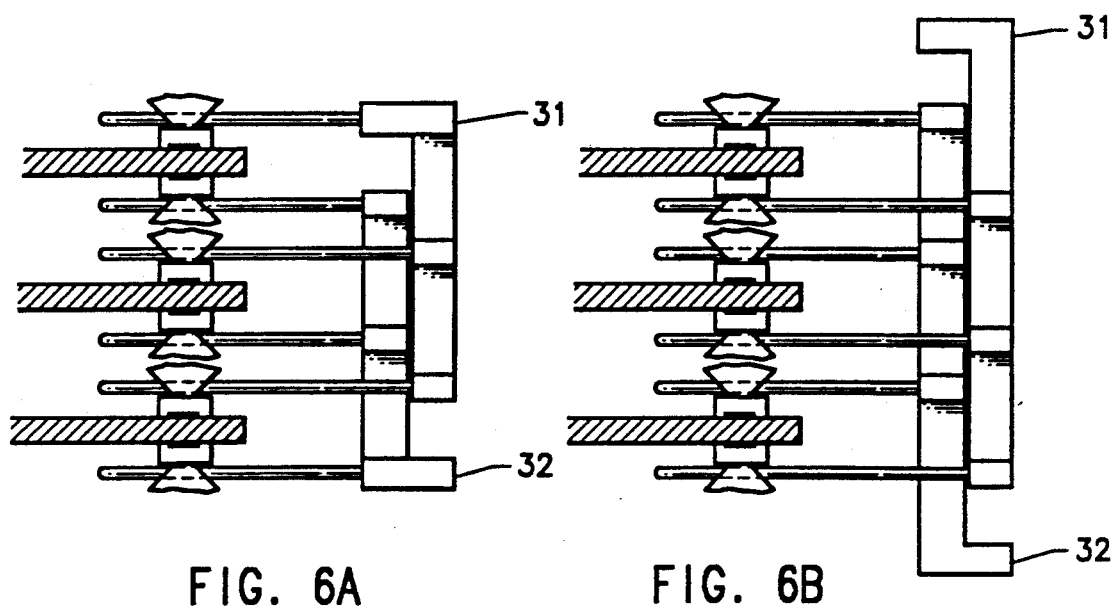

It is possible to reverse the position of the combs 31, 32 so that the fingers curved by the outer upper comb 31 lie below the surface (see FIG. 6B) of each disc rather than above each disc surface (as shown in FIG. 6A). If this approach is adapted, the heads would be lifted off the surface where the disc is to be started up, then slowly lowered back to be moved away from the comb's fingers. The sequence would be repeated whenever the disc was to be stopped.

Figure 5:
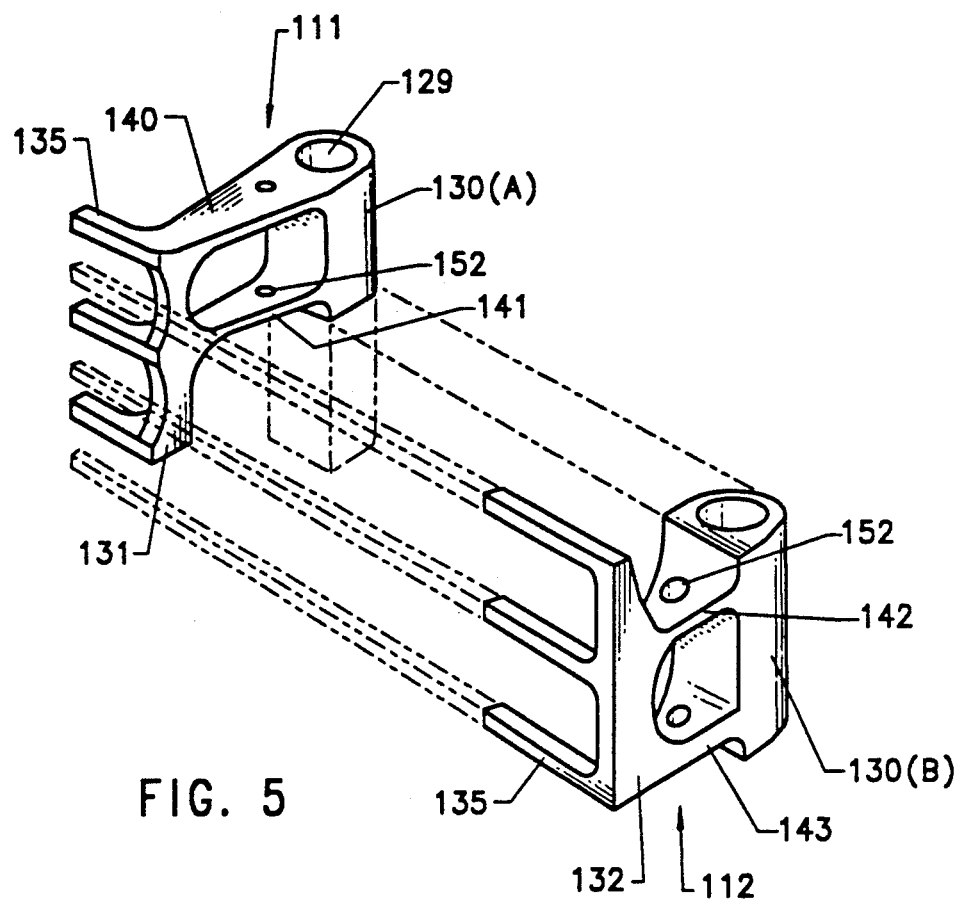
FIG. 5 is a diagrammatic broken apart perspective view of a rotary slider lifter in accordance with the present invention.

Referring next to FIG. 5, an alternative embodiment of the invention will be described. In the embodiment shown in FIGS. 1-4, the support post 30 is fixed to the housing and the slider lifter arrangement 10 is permanently positioned with the fingers 35 being permanently positioned within the disc pack. In contrast, in the embodiment shown in FIG. 5, the support post is rotatably coupled to the housing such that it may be withdrawn during normal operation of the drive.

As seen in FIG. 5, the lifting arrangement may be molded such that it includes two integrated comb structures 111 and 112. The upper comb structure 111 includes an upper post portion 130(a), upper comb member 131 together with its fingers 135 and the leaf springs 140 and 141 that couple the comb member 131 to the post 130. The leaf springs 140 and 141 each have apertures 152 therein through which the lift wire 45 may pass. Similarly, the lower comb structure 112 integrally molds a lower post portion 130(b), lower comb member 132 together with its fingers 135 and the leaf springs 142 and 143. Like the other leaf springs, leaf springs 142 and 143 have appropriately sized apertures 152 therein for receiving the lift wire 45.

The post portions 130(a) and 130(b) each have a borehole 129 passing therethrough and combine to form a post 130. A bearing (not shown) may be inserted in the borehole 129 to rotatably couple the slider lifter arrangement to the housing. A conventional motor may then be used to rotate the lifter arrangement into and out of the disc pack. It should be appreciated that once the disc drive has obtained its operational speed, the sliders will float above the disc surface without the need of any lifting action. At such times, the fingers serve no purpose and can be removed. The advantage of rotary mounting is that it allows the slider lifter arrangement to be readily rotated completely free of the disc pack, thereby eliminating the possibility of the fingers interfering with the operation of the drive or sliders. Before the drive is shut down, the slider lifter is rotated back into the disc pack. As a safety measure, it may be desirable to provide a spring biasing for the pivot bearing such that in the event of a loss of power, the slider lifter arrangement would automatically rotate back into the disc pack. In all other respects the slider lifter of this embodiment may function identically with the slider lift described in the first embodiment.

Among the many advantages of the present invention is the ability to utilize a smaller spindle motor since the motor does not need to be strong enough to overcome the static and start-up friction associated with the sliders dragging on the discs. Further, there is no need to stop the motor quickly since the adverse effects of slider friction have been eliminated. Thus, it is possible to eliminate a motor brake. The amount of disc lubricant used can also be reduced since the sliders only touch the discs when the disc pack is not rotating. Additionally, fewer contaminants are introduced into the sealed atmosphere of the disc drive assembly, since debris generated by slider friction is essentially eliminated. The storage capacity of the disc may also be increased substantially by either eliminating or reducing the size of the landing zone which is normally provided on each disc surface.

Although only a couple embodiments of the present invention have been described herein, it should be understood that the present invention may be embodied in many other specific forms without departing from the spirit or scope of the invention. Particularly, it should be appreciated that the actual materials used for the various components, including the shape memory element may be widely varied. The positioning and arrangement of the various components including the biasing mechanism may also be widely varied. Therefore, the present examples and embodiments are to be considered as illustrative and not restrictive, and the invention is not to be limited to the details given herein, but may be modified within the scope of the appended claims.

I claim:

1. A slider lifter arrangement for a disc drive assembly including a frame, a plurality of vertically aligned, spaced apart rotatable information storage discs, each information storage disc having top and bottom storage surfaces, a multiplicity of vertically aligned flexure arms each carrying a slider transducer for transferring information between a particular disc surface and an external system, the flexure arms being designed such that when the discs are rotating at an operational speed, each slider flies above the surface of its associated disc surface and wherein when the disc is stopped, the sliders rest on the surface of their associated discs, and a head positioning means for positioning the sliders relative to the information storage discs, the slider lifter comprising:

a support post coupled to the frame;

a pair of opposing comb members carried by the post, each said comb member having a plurality of stacked fingers each extending outwardly to engage one of said flexures, the comb members being adapted for movement in opposite directions between first and second positions relative to one another, wherein in one of said relative positions, the fingers engage their associated flexures to physically lift the associated sliders from their associated disc surfaces;

biasing means for urging the comb members towards the first relative position;

a shape memory alloy element having martensitic and austenitic phase conditions, the shape memory alloy element cooperating with the biasing means such that when the shape memory element is in a first phase condition, the biasing means forces the comb members to their first relative position and wherein when the shape memory alloy element is in a second phase condition, the comb members are held in their second relative position; and transform means for heating the shape memory alloy element to change the state of the shape memory alloy element from one of said phase conditions to the other phase condition.

2. A slider lifter as recited in claim 1 wherein said biasing means includes a plurality of leaf springs which couple said comb members to said post.

3. A slider lifter as recited in claim 2 wherein:

two leaf springs couple each comb member to the post, the leaf springs including two outer leaf springs and two inner leaf springs; and the shape memory alloy element is coupled between the outer leaf springs to effectuate movement between said first and second relative leaf positions.

4. A slider lifter as recited in claim 3 wherein said inner leaf springs have apertures therein and wherein said shape memory alloy element passes through the apertures without engaging the inner leaf springs.

5. A slider lifter as recited in claim 1 wherein said post is rotatably coupled to the frame for movement between a supporting position wherein said fingers can engage the flexures and a free position wherein said fingers are withdrawn from the interstitial spaces between discs.

6. A slider lifter as recited in claim 1 wherein said post is fixed to the frame.

7. A slider lifter as recited in claim 1 further comprising stop means for defining the limits of motion of the comb members relative to one another.

8. A slider lifter for a disc drive comprising:
a support post;
a pair of opposing combs carried by the post, the combs being adapted for movement in opposite directions between first and second relative positions, wherein in one of said relative positions, at least one of the combs engages a flexure to physically lift a transducers associated with the flexure from the surface of a disc associated with the transducer;
biasing means for urging the combs towards the first relative position:
a shape memory alloy element having martensitic and austenitic phase conditions, the shape memory alloy element cooperating with the biasing means such that when the shape memory element is in a first phase condition, the biasing means forces the combs to their first relative position and wherein when the shape memory alloy element is in a second phase condition, the combs are held in their second relative position; and
transform means for heating the shape memory alloy element to change the state of the shape memory alloy element from one of said phase conditions to the other phase condition.

9. A slider lifter as recited in claim 8 wherein each said comb lifts a plurality of vertically stacked flexures and the opposing combs lift flexures from opposite sides of a plurality of vertically aligned discs.

10. A slider lifter as recited in claim 9 wherein said biasing means includes a plurality of leaf springs which couple said combs to said post.

11. A slider lifter as recited in claim 10 wherein:
the leaf springs include two outer leaf springs and two inner leaf springs, with one inner leaf spring and one outer leaf spring cooperating to couple each comb to the post, the inner leaf springs each having an aperture therein;
the shape memory alloy element is coupled between the outer leaf springs to effectuate movement between said first and second relative comb positions; and the shape memory alloy element passes through the apertures without engaging the inner leaf springs.

12. A slider lifter as recited in claim 8 wherein said post is rotatably coupled to the frame for movement between a supporting position wherein said fingers can engage the flexures and a free position wherein said fingers are withdrawn from the interstitial spaces between discs.

13. A slider lifter as recited in claim 8 wherein said post is fixed to the frame.

14. A slider lifter as recited in claim 8 further comprising stop means for defining the limits of motion of the combs relative to one another.

15. A slider lifter arrangement for a disc drive assembly including a frame and a plurality of vertically aligned, spaced apart information storage discs rotatably journaled about a spindle assembly, each data storage disc having top and bottom data storage surfaces, a multiplicity of vertically aligned flexure arms each carrying a slider transducer for transferring information between a particular data storage surface and an external system, the flexures being designed such that when the discs are rotating at an operational speed the sliders fly above the surface of their associated disc and when the discs are stopped, the sliders rest on the surfaces of their associated discs, and a head positioning means for positioning the sliders relative to the information storage discs, the slider lifter comprising:
a support post coupled to the frame;
a pair of opposing comb members carried by the post, each said comb member having a plurality of stacked fingers extending outwardly to engage a plurality of said flexures, the comb members being adapted for movement in opposite directions between first and second positions relative to one another, wherein in one of said relative positions, the fingers engage their associated flexures to physically lift the associated sliders from their associated disc surfaces;
biasing means for urging the comb members towards the first relative position, the biasing means include two outer leaf springs and two inner leaf springs, with one inner leaf spring and one outer leaf spring cooperating to couple each comb member to the post, the inner leaf springs each having an aperture therein;
a shape memory alloy element coupled between the outer leaf springs to cooperate with the biasing means to effectuate movement between said first and second relative comb positions, the shape memory alloy element having martensitic and austenitic phase conditions, the shape memory alloy element cooperating with the biasing means such that when the shape memory element is in a first phase condition, the biasing means forces the comb members to their first relative position and wherein when the shape memory alloy element is in a second phase condition, the comb members are held in their second relative position; and
transform means for heating the shape memory alloy element to change the state of the shape memory from one of said phase conditions to the other phase condition.

* * * * *